Patented May 18, 1943

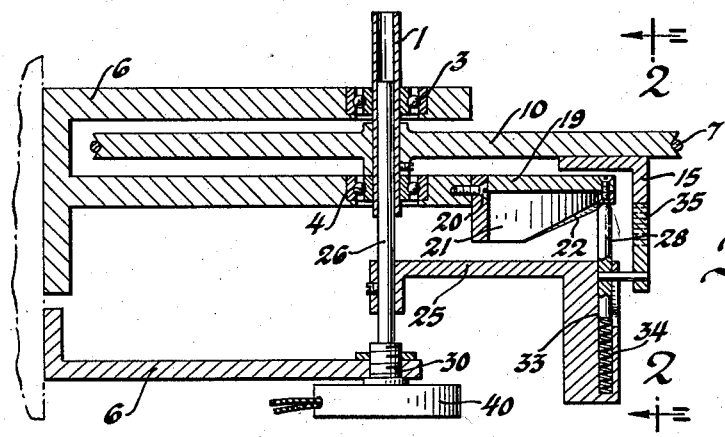
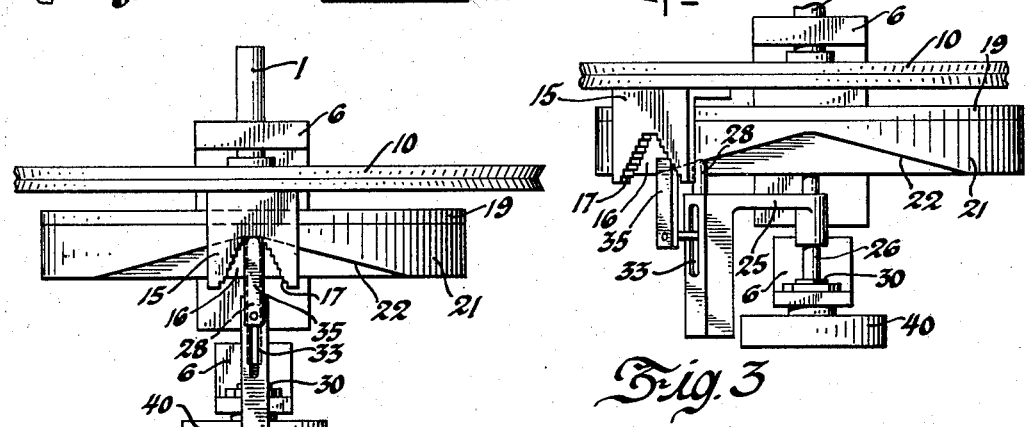
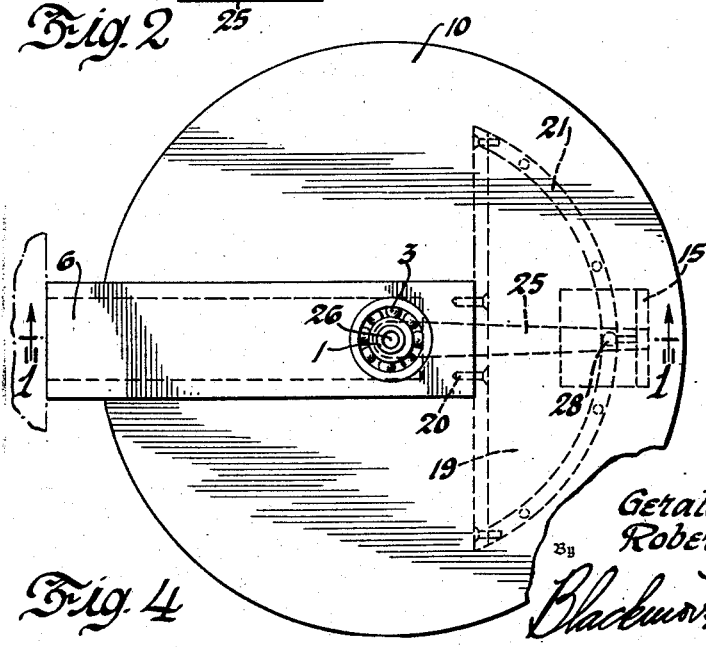
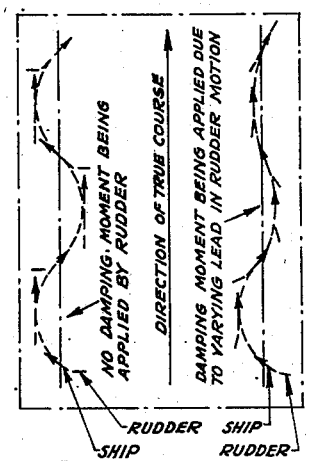

2,319,435

UNITED STATES PATENT OFFICE 2,319,435

AUTOMATIC STEERING

Gerald M. Rassweiler, Ferndale, and Robert N. Frawley, Detroit, Mich., assignors to General Motors Corporation, Detroit, Mich., a corporation of Delaware Application September 4, 1941, Serial No. 409,546

6 Claims. (Cl. 114—144)

This invention relates to a self-adjusting lost motion device for use in automatic steering gears for craft such as boats, aircraft or the like, and especially to such a device for use in automatic control of a rudder to compensate for deviations of a craft from a true course and to maintain it on a set course. Such deviations from a set course occur as a result of changing currents and other influences in the medium in which the craft moves.

It is old and well known to detect the deviations of a craft from a set course by means of a magnetic compass and to use means responding to deflections of the compass needle to control a servomotor power follow up system capable of moving the rudder to bring the craft back on its course. The servomotor is started in one direction or the other in response to the direction of deflection of the compass, and is stopped when the deflection of the rudder is proportional to the deviation of the ship from its true course, by a member which follows up the movements of the rudder and constitutes an element of the control means.

When the correcting deflection of the rudder is proportional to the deviation of the craft from its true course, the restoring moment on the craft is a function of its angular deviation and hence there is a weaving oscillation of the craft along its course which is only damped at a rate which depends on the medium in which the craft moves.

In order to provide an additional damping moment, the movement of the rudder has been modified by providing lost motion or play in the linkage between the rudder and the follow up mechanism, so that each time the movement of the rudder is reversed by the compass needle, the rudder moves through a small angle before the follow up mechanism comes into action. In this way the rudder has a "lead" over the next movement of the craft which it will be called upon to correct, such that as the craft reaches the direction of its true course in each swing the rudder is already deflected in a direction to check the angular movement of the craft rather than being in a straight ahead undeflected position.

Maximum damping effect is obtained with a maximum amount of lost motion in the linkage between the rudder and the follow up mechanism, but as the angular weaving oscillations of the craft die out the lost motion permits the rudder to be swung back and forth through an undesirably large amplitude, and "hunting" is induced, which is worse under the conditions which give the best damping, i. e., with a large amount of lost motion.

The object of the present invention is a means of varying automatically the extent of lost motion and hence the "lead" of the rudder in an automatic steering gear of the kind described, in accordance with the amplitude of the angular weaving oscillations of the craft, so that as the weaving oscillations of the craft diminish, the extent of lost motion diminishes and vice versa, and "hunting" is prevented.

A more specific object of the invention is an automatic, self adjusting means of varying the extent of lost motion as a function of the maximum deflection which the rudder has experienced in the immediately preceding oscillation.

The above and other objects of the invention will be apparent as the description proceeds.

The drawings show a construction according to the invention.

In the drawings

Figure 1 is a sectional view of the device on line 1—1 of Figure 4.

Figure 2 is a view on line 2—2 of Figure 1.

Figure 3 is a view similar to Figure 2, but with the moving parts of the device in a different position.

Figure 4 is a plan view of the device.

Figure 5 is a diagram showing a true course, and the actual course of vessels without any lead in rudder motion, and with varying lead according to the invention.

Figure 6:
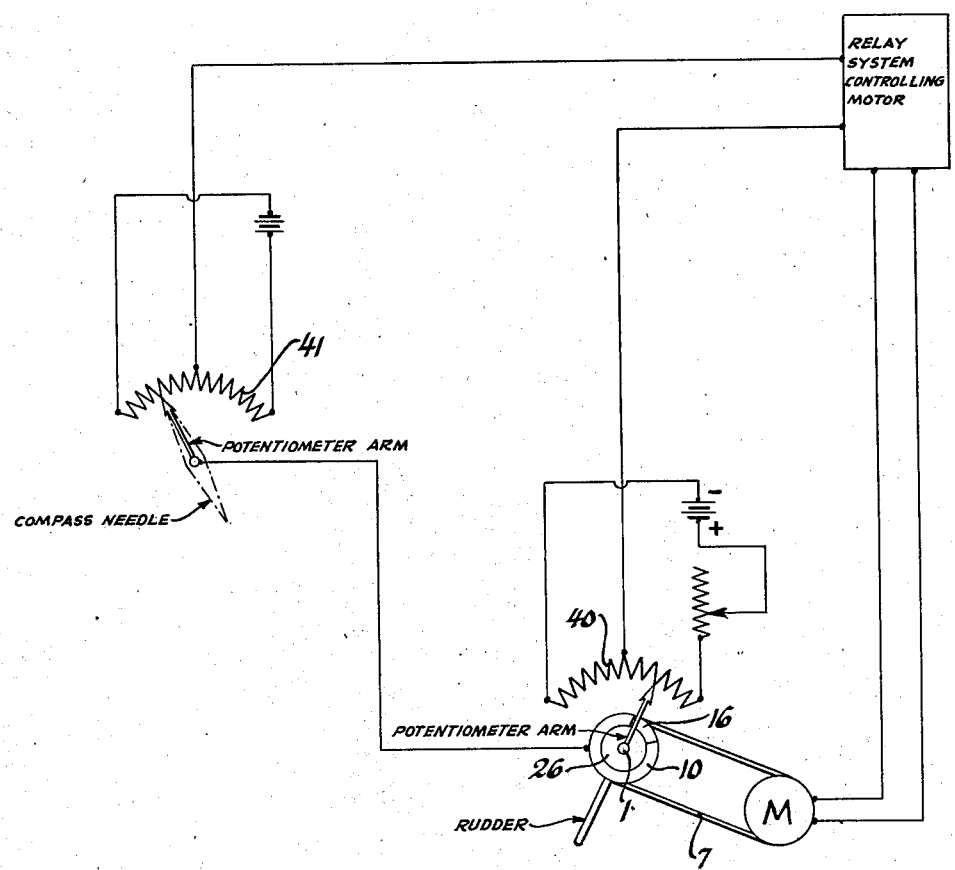
Figure 6 is a schematic diagram showing the device according to the invention as part of an electric automatic steering gear.

The rudder, the servomotor means, and the means for detecting deviation of the craft from its set course are not shown, because they may be of any suitable well known kind; suffice it to say that the automatic steering gear embodies a power actuated rudder member to which the rudder is connected, and which responds to every movement of a servomotor means which is started in one direction or the reverse in response to the direction of deflection of the deviation detecting means. The servomotor, and hence the movement of the rudder member is stopped by a follow up member having an automatically varied lost motion connection to the power actuated rudder member, whenever the rudder member has been moved an amount proportionate to the extent of deflection of the deviation detecting means plus the lost motion, if it is not previously reversed by a reversal of the direction of deflection of the deviation detecting means.

As shown in Figure 6, the rudder is secured to a shaft 1 provided with a pulley 10 through which it is turned in either direction by a cable 7 from an electric motor M.

The potentiometer arm of a potentiometer 40 has a pivot axis coaxial with the shaft 1 and constitutes a follow up member for the rudder. It may be turned with the pulley 10, the shaft 1 and the rudder except to the extent that there is lost motion between these parts and the potentiometer arm depending on the width of the slot 16 in the pulley 10.

The potentiometer arm of another potentiometer 41 exactly follows the movements of a compass needle which detects deviations of the craft from its set course.

The potentiometers 40 and 41 both feed a relay system controlling the driving motor M, but they are so arranged and their circuits are such that the signal from the potentiometer 41 which in direction and magnitude depends on the direction and extent of deviation of the craft from its set course is opposed by a signal from the potentiometer 40 of which the magnitude depends on the extent to which the potentiometer arm of potentiometer 40 is turned from its neutral position as the rudder is turned in the required direction to bring the craft back on its course.

Assuming the rudder and the arm of the potentiometer 40 to be in a neutral position, then if the craft deviates from its true course by any given angle a proportionate signal from the potentiometer 41 actuates the relay system to turn the motor and hence the rudder in the required direction to correct the deviation.

The rudder "leads" the arm of the potentiometer 40 to the extent of the lost motion therebetween and its motion continues until the arm of the potentiometer 40 reaches a position in which the signal therefrom is equal to the signal from the potentiometer 41. Since these signals are opposed to each other the relays are then receiving no signal and the motor is stopped.

As the craft turns back towards its true course the signal from the directional sensitive device (compass) decreases and is overbalanced by the rudder signal. The relay system is again actuated but in a manner to turn the motor and the rudder in an opposite direction, the motor always seeking to move the rudder and the arm of the potentiometer 40 to a position in which the signal from the potentiometer 40 will balance the signal from the potentiometer 41. The relative angles from neutral through which the respective potentiometer arms must be turned to effect this balance can readily be adjusted by changing a resistance in one or both of the potentiometer circuits.

Referring now to Figures 1 to 4, which show the self-adjusting device according to the invention, by which the lost motion between the rudder member and its follow up member is automatically varied, the power actuated rudder member is shown as a tubular shaft 1 mounted in ball bearings 3 and 4 in a fixed frame 6. The shaft 1 is turned by means of the pulley 10 and the cable 7 to move the rudder in the manner shown in Figure 6.

Secured to the pulley 10 at a point near its outer circumference, and extending therebelow, is a lug 15 in which there is a V-shaped slot 16, which has steps or notches 17 in its sides.

A stationary member 19, secured to the frame 6 by screws 20, has an arcuate rim portion 21 in which a V-shaped depression 22 constituting a cam surface has been formed. The V-shaped depression 22 is much more obtuse than the V-shaped slot 16.

At the end of an arm 25 which is secured to a shaft 26 constituting a follow up member for the power actuated rudder member 1 with which it is coaxial is a follower 28 for the cam surface 22. The shaft 26 is supported in a bearing 30 on the frame 6, and in the tubular shaft 1. The cam follower 28 is slidable in a pocket 33 in the end of the arm 25 and is resiliently urged against the cam surface 22 by a spring 34. The cam follower 28 is also adapted to engage any of the notches 17 in the V slot 16, for which purpose it is provided with an extension 35.

As shown, turning of the follow up member 26 is arranged to vary the resistance of a potentiometer 40 in a suitable electrical control system such as that shown in Figure 6, but it will be appreciated that the follow up member 26 constitutes an element of any automatic control means suited to the particular type of servomotor means which might be employed.

The parts 10 to 35 provide a self adjusting lost motion connection between the power actuated rudder member 1 and the follow up member 26 to give the requisite varying "lead" to a rudder. The relative positions of a ship and its rudder without any "lead" in the rudder to effect damping of the ship's weaving oscillations about its true course, as compared with the relative positions of a ship and its rudder provided with a varying "lead" to produce a damping moment without hunting, are shown diagrammatically in Figure 5.

Figures 1, 2, and 4 show the position of the parts with the power actuated rudder member 1 in a position corresponding to the straight ahead, neutral or equilibrium position of the rudder, with the cam follower 28 at the apex of the V-shaped depression 22 and its extension 35 at the apex of the V slot 16, a condition in which all lost motion between the parts is eliminated, while Figure 3 shows the position of the parts at one end of a swing of the power actuated rudder member 1 away from its neutral position and with a lost motion condition established for the next swing of the rudder in an opposite direction.

The extent of lost motion between the power actuated rudder member 1 and the follow up member 26 depends upon the depth of engagement and hence the amount of lost motion clearance or play between the extension 35 and the sides of the V slot 16 as parts of the follow up member and the rudder member, respectively; said play depending on the extent to which the cam follower 28 is displaced vertically by the cam surface 22, which is dependent on the extent to which the power actuated rudder member has last been turned in either direction from its neutral position.

Thus, as the power actuated rudder member is turned in either direction from a neutral position in which the follow-up member has no lost motion, Figures 1 and 2, to a position such as that shown for example in Figure 3, the follow up member 26 is turned by the arm 25 which is carried around by contact of its extension 35 with a side of the V slot 16. At the same time, however, the cam follower 28 is progressively depressed the farther it traverses a sloping side of the stationary cam surface 22, and as its extension 35 slips down the stepped side of the V slot 16 into one or another of the progressive notches 17, lost motion is introduced between the rudder member and the follow-up member. It will be apparent that the extent of the lost motion thus introduced is equal to the horizontal distance traversed over the steps by the part 35, which is approximately proportional to the deflection of the rudder member from neutral.

When the point of maximum deflection of the power actuated rudder member 1 from its neutral position is reached, it is reversed and turned in an opposite direction, but the arm 25 is not turned with it, and there is lost motion equal to twice the above mentioned amount, until the opposite side of the V slot 16 strikes the extension 35 which, with the cam follower 28, has in the interim remained stationary on the cam surface in the position to which it was previously carried by the other side of the V slot 16. This lost motion of the follow-up member prevails for the complete swing of the rudder member succeeding the half swing in which it was determined, unless the maximum deflection of the rudder member increases, and after this lost motion has been taken up, the cam follower 28 is held from contact with the cam 22 by engagement of its extension 35 with that one of the notches 17 opposite the particular notch 17 to which it was previously displaced, as the arm 25 and hence the follow-up member is carried along with the rudder member. If the maximum deflection of the rudder member on this swing is increased, the lost motion is further increased in the same manner in which it was originally introduced.

If, on the other hand, the maximum deflection of the rudder member is reduced, then the direction in which the power actuated rudder member is turned is again reversed, and as the extension of the cam follower is released from the notches 17 in that side of the V slot with which it has last been engaged, the cam follower 28 is urged by the spring means 34 into contact with the cam 22 in a new position of lessened vertical displacement hence providing lessened lost motion between the rudder member and the follow-up member, in accordance with the lessened maximum displacement of the power actuated rudder member which has just been experienced.

The device thus automatically readjusts the "lead" of a rudder each time its direction of turning is reversed, as a function of the maximum deflection which the rudder has just received, which is a function of the maximum last angular deviation of the craft from its true course and is related to the angular velocity with which the craft swings through its true course.

It will be appreciated that the notches 17 in the sides of the V slot 16 eliminate force components which might otherwise exist and be effective between the members 15 and 35 to change their depth of engagement and hence the lost motion clearance therebetween which, as shown, is determined solely by the cam 22.

We claim:

1. In an automatic steering gear to maintain a craft on a set course, of the kind in which a power actuated rudder member is deflected in one direction and the other from neutral by servomotor means responding to oscillating deviations of the craft from its set course, and a follow up member following up the movement of the rudder with lost motion constitutes an element of the control means therefor; means comprising an automatic self adjusting device responsive to movement of the rudder member for varying the extent of lost motion as a function of the maximum deflection which the power actuated rudder member has immediately before experienced.

2. In a steering gear with a power actuated rudder member and a follow up member therefor constituting an element of an automatic control means for the rudder member, such that upon deviating oscillations of the craft from its set course the rudder member is turned to produce a restoring moment which is a function of the angular deviation of the craft from its course; means comprising an automatic self adjusting lost motion device between the rudder member and the follow up member including interengaging parts on said members with lost motion clearance therebetween depending on their depth of interengagement, and a stationary cam surface traversed by one of said parts upon steering movement of the rudder member, for moving said part to change the depth of interengagement of said parts in accordance with the maximum deflection which the rudder member has just experienced whereby, in every oscillation, the rudder member has a damping "lead" over the weaving oscillations of the craft along its course proportionate to the maximum angular deviation and the angular velocity of the craft in that oscillation immediately preceding, and "hunting" is prevented.

3. In a steering gear for a craft having a power actuated rudder member with automatic control means therefor to produce a restoring moment on the craft which is a function of its angular deviation from a set course, a follow up member for the rudder member, constituting an element of the control means, and an automatically varied lost motion device between the rudder member and the follow up member, including a cam follower on the follow-up member, a part of said cam follower interengaging with a part of the rudder member with lost motion therebetween depending on their depth of interengagement, and a stationary cam surface traversed by said cam follower upon steering movement of the rudder member, for moving said cam follower to change the depth of interengagement of said parts in accordance with the maximum deflection which the rudder member has just experienced whereby in every weaving oscillation of the craft along its course the extent of lost motion and hence the "lead" of the rudder member is self adjusting to be proportionate to the maximum angular deviation and the angular velocity of the craft in that oscillation immediately preceding, and "hunting" is prevented.

4. In an automatic steering gear to maintain a craft on a set course, having lost motion between a power actuated rudder member and a follow up member therefor constituting an element of an automatic control means for the rudder member, said lost motion giving the rudder member a damping "lead" over the deviating oscillations of the craft from its set course, means to prevent "hunting" by varying the extent of lost motion and hence the "lead" of the rudder member in proportion to the maximum angular deviation of the craft in its immediately preceding oscillation, including a V-shaped slot with notched sides on the rudder member, a cam surface on a stationary member and a cam follower therefor on the follow up member; said cam follower being adapted to engage one or another of the notches in the V-shaped slot and being resiliently held against the cam surface except when this is prevented by its engagement with a notch in the V-shaped slot; the extent of lost motion between the rudder member and the follow up member being the distance between opposite sides of the V-shaped slot at the depth of the particular notch therein to which the cam follower has been displaced by the cam surface in the immediately preceding oscillation of the rudder member.

5. The combination according to claim 4 in which the power actuated rudder member is a shaft turnable in bearings in a suitable frame and having a pulley secured thereto; the follow up member is a shaft coaxial with the rudder member; the V-shaped slot is formed in a lug on the pulley at a point near its outer circumference and extending therebelow; the cam surface is a V-shaped depression in the arcuate rim portion of a member secured to the frame below the pulley; and the cam follower is slidable in a pocket in an arm on the follow up member and resiliently urged towards the apices of the said V-shaped slot and the said V-shaped depression.

6. In a steering gear to maintain a craft on a set course, a rudder member, a follow-up member therefor, and automatic self-adjusting means providing lost motion therebetween proportionate to the maximum deflection which the rudder member has experienced on its immediately preceding swing, including a cam surface on a stationary part traversed by said members, and interengaging parts on said members with lost motion clearance therebetween dependent on their depth of interengagement, one of said interengaging parts constituting a cam follower resiliently urged towards said cam surface, and adapted upon steering movement of the rudder member to be moved by said cam surface to vary the said depth of engagement.

GERALD M. RASSWEILER.
ROBERT N. FRAWLEY.